United States Patent Office 2,816,749
Patented Dec. 17, 1957

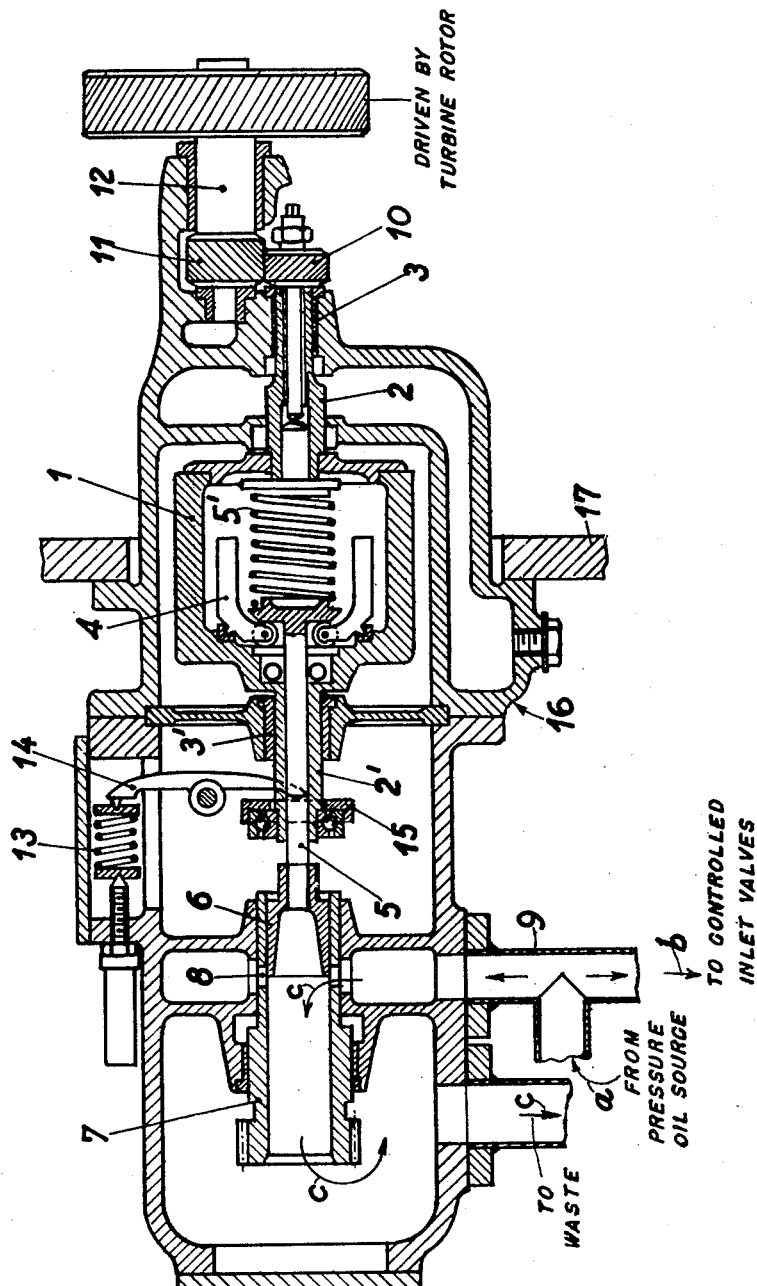

2,816,749

SPEED REGULATOR FOR TURBINES

Arthur Oberle, Wettingen, Switzerland, assignor to Aktiengesellschaft Brown, Boveri & Cie, Baden, Switzerland, a joint-stock company Application December 6, 1954, Serial No. 473,347

Claims priority, application Switzerland December 12, 1953

4 Claims. (Cl. 264—6)

This invention relates to a speed regulator for turbines and more particularly to a regulator of the type in which a centrifugal governor regulates the pressure of oil in an oil system which in turn varies the setting of the turbine inlet valves in accordance with the presure in the oil system, and thereby in accordance with changes in the turbine speed as a result of variations in the load.

Such regulators vary the motive fluid supply to the turbine to maintain a substantially constant speed under all conditions from full load to no load but with a leeway, which is deemed permissible, such leeway being termed the "coefficient of cyclic variations." Such governors are subject to the disadvantage that they reduce the power input only when the speed has increased by the amount of the cyclic variation, and they may fail to throttle the input in time to prevent actuation of the auxiliary safety regulator in the event that the load is suddenly removed. This can happen since, with the inlet valves fully open, the turbine speed can increase as much as 50 revolutions per minute within 1/10 of a second upon a sharp decrease in the load. For this reason so-called "inertia governors" have been developed which react immediately upon a sudden increase in speed to limit the power input to the turbine. An inertia governor may consist of a flywheel mass driven by the turbine rotor but which lags behind the rotor when the rate of speed change exceeds a selected limit; the lag being employed to effect a sudden drop in the pressure in the oil system controlling the inlet valves, thereby leading to a quick adjustment of the inlet valves to reduce the power input.

Objects of the present invention are to provide speed regulators for turbines, particularly steam turbines having a pressure oil system for controlling the inlet valves, which are of economical construction and which include the feature of an inertia governor. An object is to provide a centrifugal regulator for use with a pressure oil system in which the centrifugal governor itself and its casing constitute the flywheel mass of an inertia governor. An object is to provide a regulator comprising an axially movable centrifugal speed governor for adjusting the pressure oil system of a turbine, and a drive for the centrifugal governor including helical gears, whereby the inertia of the governor effects relative axial movement of the meshing helical gears upon a sudden increase in turbine speed to effect a quick reduction in pressure in the oil system.

These and other objects and the advantages of the invention will be apparent from the following specification when taken with the accompanying drawing in which the single view is a longitudinal section through a speed regulator embodying the invention.

In the drawing, the reference numeral 1 identifies the casing of a centrifugal governor caried by shafts 2, 2' rotatable in stationary bearings 3, 3'. Weighted arms 4 are pivotally supported within the case 1 to move the governor rod 5 axially within the hollow shaft 2', in opposition to spring 5', in accordance with the speed of the turbine rod. Rod 5 carries or is integral with a sleeve valve 6 which is slidable within the bushing 7 to control the flow of pressure oil through the ports 8 of the bushing wall. The pressure oil system is of known type and comprises a pipe 9 to which oil is supplied under pressure from a source, not shown, as indicated by arrow $a$; the pipe 9 communicating with the interior of bushing 7 through the ports 8 and also with the pressure chambers, not shown, of the inlet valves, as indicated by the arrow $b$. The inlet valves are modulated in known manner by the centrifugal governor as it adjusts sleeve valve 6 to control the pressure in pipe 9 by venting pressure oil to waste through the ports 8 and bushing 7, as indicated by arrows $c$.

In accordance with the invention, the centrifugal governor, including its case 1 and shafts 2, 2' constitutes the flywheel mass of an inertia governor and is axially slidable in the bearings 3. Shaft 2 has fixed thereto a helical gear 10 in mesh with a relatively wide helical gear 11 that is driven by the turbine rotor either directly or, as shown, through an intermediate shaft 12. This rotating mass is yieldingly urged in that direction which tends to block flow through the ports 8, i. e. towards the left as seen in the drawing, by an adjustable spring 13 which presses a lever 14 against a flange 15 on shaft 2', whereby helical gear 10 normally bears against the right hand bearing 3.

Upon a sharp decrease in the load and resulting quick increase in speed, the rotating mass moves axially to the right in view of its inertia and the quick pressure increment on the helical gears 10, 11. Sleeve valve 6 is thus moved to increase the opening of the ports 8. The resultant drop in oil pressure in pipe 9 takes place before the centrifugal governor has reached the higher speed corresponding to the reduced load, and the inlet valves are thus quickly adjusted to prevent racing of the turbine.

Under normal conditions of small or gradual variations in the load, the spring 13 retains the elements of the regulator in the illustrated positions and the inlet valves are progressively adjusted in accordance with changes in the turbine load to maintain a substantially constant speed.

Speed governors of known type for use with pressure oil control lines may be readily converted to operate simultaneously as inertia governors since the only parts required, in addition to helical drive gears and bearings allowing axial movement of a helical gear and parts associated therewith, are the biasing means for normally holding the helical gear against axial displacement. It is thus possible to provide a turbine having some form of generally known speed regulator with the additional safety of an inertia governor at low additional cost.

The entire assembly is supported within a housing 16 which may be made up of a desired number of sections and mounted on a support 17 that may be a part of or secured to the turbine.

I claim:

1. A speed regulating device comprising a rotatable input shaft, a centrifugal governor and an inertia governor arranged to be driven by said input shaft, said inertia governor comprising a case having shafts at both ends thereof journalled in bearings and axially movable relatively therein, said centrifugal governor being mounted within said case and forming a part of said inertia governor, and an auxiliary movable output shaft independently adjustable by said centrifugal governor and said inertia governor, said output shaft being progressively adjustable axially by said centrifugal governor in accordance with change in rotational speed of said input shaft and by said inertia governor in accordance with sudden changes in shaft speed before said centrifugal governor becomes responsive thereto.

2. A speed regulating device as defined in claim 1 wherein said output shaft extends colinearly through one of the shafts of said inertia governor case and is slidably movable therein, and said centrifugal governor comprises weighted arms pivotally connected to said output shaft within said inertia governor case.

3. A speed regulating device as defined in claim 2 including helical gear means for driving said input shaft comprising a driven helical gear secured to said input shaft and a meshing driving helical gear, and spring means normally retaining said inertia governor in an inoperative position with said driven helical gear against one of said bearings in opposition to the axial thrust imparted thereto by said driving helical gear, whereby upon sudden increase of driving speed of said driving helical gear a force is imparted through said driven helical gear to said inertia governor exceeding the force of said spring retaining means to allow said inertia governor to move axially to thereby adjust axially the position of said output shaft.

4. A speed regulating device comprising an axially movable output shaft, a centrifugal governor and an inertia governor for independently adjusting the axial position of said output shaft, said inertia governor comprising a casing containing said centrifugal governor, said casing having shaft means supporting the same for rotation and for axial movement in fixed bearings, a driven helical gear secured to said shaft means, a relatively wide helical driving gear meshing with said driven helical gear, and spring means developing a force blocking axial movement of said driven helical gear at the pressure exerted thereon by said relatively wide helical gear under changes of speed of said driving helical gear below a predetermined rate and insufficient to block axial movement of said driven helical gear at the pressure exerted thereon at sudden increase in driving speed of said driving helical gear.

References Cited in the file of this patent
UNITED STATES PATENTS

| | | |
|---|---|---|
| 821,286 | Grant | May 22, 1906 |
| 2,336,654 | Tippen | Dec. 14, 1943 |

UNITED STATES PATENT OFFICE
CERTIFICATE OF CORRECTION

Patent No. 2,816,749                                             December 17, 1957

Arthur Oberle

It is hereby certified that error appears in the printed specification of the above numbered patent requiring correction and that the said Letters Patent should read as corrected below.

Column 2, line 66, for "auxiliary" read -- axially --.

Signed and sealed this 11th day of February 1958.

(SEAL)

Attest:
KARL H. AXLINE
Attesting Officer

ROBERT C. WATSON
Commissioner of Patents